(12) United States Patent
Muron et al.

(10) Patent No.: US 9,012,359 B2
(45) Date of Patent: Apr. 21, 2015

(54) ACTIVATING SUPPORTS

(75) Inventors: Melanie Muron, Istres (FR); Gaelle Pannier, Brussels (BE); Christopher John Whiteoak, Tarragona (ES); Roger Spitz, Lyon (FR); Christophe Boisson, Tramoyes (FR)

(73) Assignee: Ineos Sales (UK) Limited, Lyndhurst, Hampshire (GB)

( * ) Notice: Subject to any disclaimer, the term of this patent is extended or adjusted under 35 U.S.C. 154(b) by 15 days.

(21) Appl. No.: 13/994,216

(22) PCT Filed: Jan. 12, 2012

(86) PCT No.: PCT/EP2012/050440
§ 371 (c)(1),
(2), (4) Date: Jun. 14, 2013

(87) PCT Pub. No.: WO2012/098045
PCT Pub. Date: Jul. 26, 2012

(65) Prior Publication Data
US 2013/0274429 A1    Oct. 17, 2013

(30) Foreign Application Priority Data
Jan. 20, 2011    (EP) .................................... 11151547

(51) Int. Cl.
| | | |
|---|---|---|
| *C08F 4/02* | (2006.01) | |
| *C08F 4/6592* | (2006.01) | |
| *C08F 110/02* | (2006.01) | |
| *C08F 210/16* | (2006.01) | |
| *C08F 4/76* | (2006.01) | |
| *C08F 10/00* | (2006.01) | |
| *C08F 4/52* | (2006.01) | |

(52) U.S. Cl.
CPC . *C08F 4/76* (2013.01); *C08F 10/00* (2013.01); *C08F 4/52* (2013.01); *C08F 4/6592* (2013.01); *C08F 210/16* (2013.01); *C08F 2420/02* (2013.01); *C08F 4/65927* (2013.01); *Y10S 526/943* (2013.01)

(58) Field of Classification Search
CPC .... C08F 4/02; C08F 4/65912; C08F 2420/02; C08F 110/02; C08F 210/16
USPC .......... 502/439, 103, 152, 120; 526/129, 139, 526/160, 348, 943, 145
See application file for complete search history.

(56) References Cited

U.S. PATENT DOCUMENTS

| | | |
|---|---|---|
| 4,455,386 A | 6/1984 | Lynch et al. |
| 6,300,271 B1 | 10/2001 | McDaniel et al. |

FOREIGN PATENT DOCUMENTS

EP    1 749 842 A1    2/2007

*Primary Examiner* — Caixia Lu
(74) *Attorney, Agent, or Firm* — Nixon & Vanderhye P.C.

(57) ABSTRACT

Activating supports may be suitably prepared by the following procedure (a) providing a porous mineral oxide support material, (b) treating the support with a phosphorus-containing compound, (c) treating the support from step (b) with an organometallic compound, (d) heating the functionalized support from step (c) under an inert gas and then under an atmosphere comprising oxygen, (e) fluorinating the support with a fluorinating agent, and (f) recovering an activating support. The activating supports are suitable used in combination with single site catalysts for the polymerization of olefins. The supports are most preferably used in combination with metallocene complexes. The preparative route for the activating supports provides for supported polymerization catalyst systems having excellent activities.

25 Claims, 1 Drawing Sheet

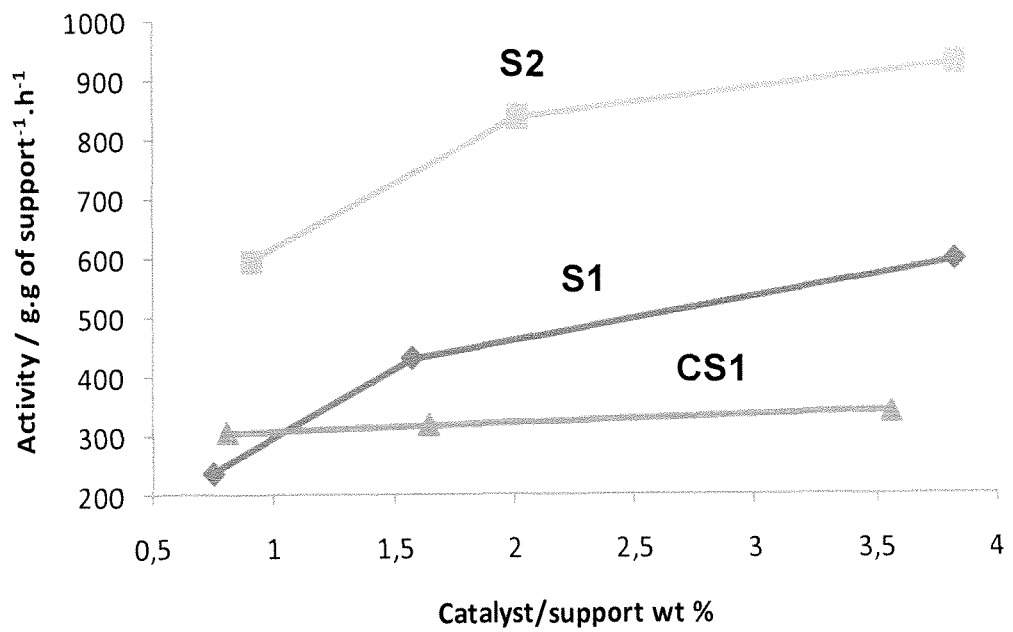

ACTIVATING SUPPORTS

This application is the U.S. national phase of International Application No. PCT/EP2012/050440 filed 12 Jan. 2012 which designated the U.S. and claims priority to European Patent Application No. 11151547.4, filed 20 Jan. 2011, the entire contents of each of which are hereby incorporated by reference.

The present invention relates to supported catalysts suitable for the polymerization of olefins and in particular to activated supports and a method for their preparation. The use of the activating supports, in particular with metallocene catalysts, provide advantages for operation in both gas and slurry phase processes for the polymerization of ethylene or the copolymerization of ethylene and $\alpha$-olefins having from 3 to 10 carbon atoms.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. The above single site catalyst systems such as metallocene complexes may be used for the polymerization of olefins in solution, slurry or gas phase. When used in the slurry or gas phase the metallocene complex and/or the activator are suitably supported. Typical supports include inorganic oxides eg. silica or polymeric supports may alternatively be used.

Examples of the preparation of supported metallocene catalysts for the polymerization of olefins may be found in WO 94/26793, WO 95/07939, WO 96/00245, WO 96/04318, WO 97/02297 and EP 642536.

The above supported polymerization catalyst systems may in some cases lead to certain disadvantages such as cost, instabilities as well as poor morphology of the resultant polymers as well as problems with gels and the like when subsequently transformed into films and other articles.

In recent years attempts have been made to replace the activator or cocatalyst components of the supported polymerization catalyst systems by use of activating supports.

EP 906920 describes fluorine-containing activator solid supports for metallocenes wherein the surface of the support has been modified by aluminium (or magnesium) Lewis-acid sites of formula Al—F or AlF$_2$. The supports are prepared by a method comprising reaction of the surface —OH radicals with a functionalisation agent followed by fluorination.

WO 2005/075525 describes methods for preparing activating supports for metallocenes wherein the supports are treated with fluorinated functionalizing agents followed by heating and treatment with oxygen.

WO 2007/014889 describes similar supports prepared by functionalizing the support with an alkylating agent followed by heating under an inert gas then under oxygen and finally treatment with a fluorinating agent.

WO 2007/12465 describes fluorinated transition metal catalysts based on supports comprising bonding sequences selected from Si—O—Al—F.

WO 2007/131856 describes mono- or di-fluorinated metallocene catalyst components supported on fluorinated activating supports.

U.S. Pat. No. 7,884,163 describes phosphated/fluorided supports of silica coated alumina wherein the support is treated sequentially with ammonium bifluoride and phosphoric acid.

More recently WO 2010/037808 describes activating supports based on perfluorinated boronic acids and aluminium alkyls and their use in the activation of metallocene complexes.

We have now surprisingly found novel activating supports may be suitably prepared and used for the activation of transition metal compounds and the subsequent use of the supported catalyst systems for the polymerization of olefins. The novel activating supports are intended to be used as replacements for the traditional activators such as methyl aluminoxane and borates and also lead to supported catalyst systems showing improved activities.

Thus according to a first aspect of the present invention there is provided an activating support prepared by the steps of (a) providing a porous mineral oxide support material,
(b) treating the support with a phosphorus-containing compound,
(c) treating the support from step (b) with an organometallic compound,
(d) heating the functionalized support from step (c) under an inert gas and then under an atmosphere comprising oxygen,
(e) fluorinating the support with a fluorinating agent, and
(f) recovering an activating support.

Support Material

The porous mineral oxide is advantageously chosen from silica, alumina or mixtures thereof but preferably it is silica.

Suitable silicas are those having surface areas in the range 100 to 1000 m$^2$/g, preferably in the range 200 to 600 m$^2$/g.

Suitable silica have an average particle diameter between 15 micrometers and 150 micrometers (15 $\mu$m<d50<150 $\mu$m).

Suitable silicas include Grace Davison Sylopol 2229 and 2408 silicas or ES70 or CS2050 silicas from PQ Corporation.

The support material may be subjected to a heat treatment (calcination) to reduce the water content or the hydroxyl content of the support material. Prior to its use the support material may be subjected to treatment at 100° C. to 1000° C. and preferably at 150 to 850° C. under an inert gas flow or under reduced pressure.

The support material is preferably calcined prior to treatment with the functionalization agent but in an alternative procedure the support material may be treated with the functionalization agent prior to calcination.

Phosphorus-Containing Compound.

The preferred phosphorus-containing compound is a phoshorylating agent which may typically be a phosphorous acid and derivatives, fluorinated phosphoric acid, metaphosphates or similar.

Most preferred phosphorylating agents are typically phosphorous acids and derivatives such as phosphoric acid or phosphorous oxychloride [POCl$_3$].

Preferably the phosphorylating agent is used in greater than equimolar amount with respect to the hydroxyl groups of the support material. It is also preferred that the phosphorylating agent is used in less than five molar amounts with respect to the hydroxyl groups of the support material. A more preferred range of the molar ratio of phosphorylating agent to hydroxyl groups of the support material is between 1 and 2, the most preferred range is 1 to 1.5.

Organometallic Compound

The organometallic compound is typically selected from an alkylated derivative of a metal of Groups 1, 2 or 13 and is preferably a metal of Group 13.

Preferred metals are aluminium, boron, lithium or magnesium.

Preferably the organometallic compound is selected from an alkylated derivative of aluminium or boron such as triethylaluminium or triethylboron.

Most preferred organometallic compounds are organoaluminum compounds. A most preferred organoaluminum compound is triethylaluminium (TEA).

Preferably the organometallic compound is used in greater than equimolar amount with respect to the hydroxyl groups of the support material. It is also preferred that the organometallic compound is used in less than ten molar amounts with respect to the hydroxyl groups of the support material. A more preferred range of the molar ratio of phosphorylating agent to hydroxyl groups of the support material is between 1 and 5, the most preferred range is 1.5 to 3.5.

Thermal Treatment

The functionalized support is subjected to a thermal treatment under an inert gas such as argon or nitrogen and is carried out a temperature in the range 100-600° C. and most preferably in the range 150-450° C.

The support is then further subjected to treatment under an atmosphere comprising oxygen at temperature in the range 100-600° C. and most preferably in the range 150-450° C.

The atmosphere may comprise air or pure oxygen or mixtures thereof.

Fluorinating Agent

Suitable fluorinating agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, fluorinated phosphorous compounds such as $PO_3H_2F$ or $C_6F_5PO_3H_2$, analogs thereof, and combinations thereof.

A preferred fluorinating agent is ammonium hexafluorosilicate [($NH_4)_2SiF_6$].

Preferably more than 1 wt % of the fluorinating agent is used with respect to the support material functionalised with a phosphorylating agent and an organometallic compound. It is also preferred that less than 50 wt % of fluorinating agent is used with respect to the support material functionalised with a phosphorylating agent and an organometallic compound. A more preferred range of the fluorinating agent being used is between 1 and 40 wt %, the most preferred range is 5-25 wt %.

According to another aspect of the present invention there is provided an activating support prepared as defined above.

According to a further aspect of the present invention there is provided an activating support comprising a porous mineral oxide support material, phosphorus, fluorine and a Group 1, 2 or 13 metal, said activating support prepared by a method comprising contacting the porous mineral oxide support material with a phosphorus-containing compound, an organometallic compound of a metal of Groups 1, 2 or 13 and a fluorinating agent.

The preferred organometallic compounds are those comprising aluminium or boron.

According to a further aspect of the present invention there is provided an activating support comprising a porous mineral oxide support material, phosphorus and fluorine wherein said activating support is prepared by contact of said porous mineral oxide support material with a phosphorus-containing compound prior to contact with a fluorinating agent.

The preferred mineral oxide support material is silica.

According to another aspect of the present invention there is provided an activating support comprising a porous mineral oxide support material, phosphorus, fluorine and an organometallic compound having a Group 1, 2 or 13 Group metal.

With respect to these aspects of the present invention the aforementioned preferred components and weights/ratios are suitably applicable.

The activating supports of the present invention may suitably be used as components of olefin polymerization catalyst systems and as such may be combined with polymerization catalysts, in particular comprising transition metal compounds.

The polymerisation catalyst may typically be a transition metal complex of Groups 3 to 12 of the Periodic Table of Elements (IUPAC Version). Examples of such complexes are well known in the art.

There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis(cyclopentadienyl) and mono (cyclopentadienyl) complexes have been described in WO 96/04290 and WO 95/00526 respectively.

The above metallocene complexes are utilised for polymerization in the presence of a cocatalyst or activator. Typically activators are aluminoxanes, in particular methyl aluminoxane or alternatively may be compounds based on boron compounds.

Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479, EP 418044 and EP 551277.

More recently other single site catalyst systems have been developed. For example based on metal complexes comprising late transition metals such as iron, cobalt, ruthenium and manganese.

Examples of such compounds are described in WO 98/27124, WO 99/12981, EP 1015501 and EP 1276777 and EP 1414772 and may be illustrated by [2,6-diacetylpyridinebis(2,6-diisopropylanil)$FeCl_2$], 2,6-diacetylpyridinebis(2,4,6-trimethylanil) $FeCl_2$ and [2,6-diacetylpyridinebis(2,6-diisopropylanil)$CoCl_2$].

Chem. Rev. 2003, 103, 283-315, Chem. Rev. 2000, 100, 1169-1203 and Angew. Chem. Int. Ed. 1999, 38, 428-447 provide further details of suitable metallocene complexes and other single site catalysts.

Other catalysts include derivatives of Groups 3, 4 or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group 14 of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalysts of the present invention comprise bulky ligand compounds also referred to as metallocene complexes containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

where L is a cyclopentadienyl ligand, M is a Group 4 metal, Q is a leaving group and x and n are dependent upon the oxidation state of the metal.

Typically the Group 4 metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (0,3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815 EP 418044, EP 420436 and EP 551277. Suitable complexes may be represented by the general formula:

wherein Cp is a single cyclopentadienyl or substituted cyclopentadienyl group optionally covalently bonded to M through a substituent, M is a Group 4 metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp foams a metallocycle with M and n is dependent upon the valency of the metal.

Particularly preferred monocyclopentadienyl complexes have the formula:

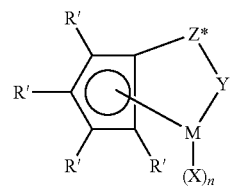

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure:

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl) phosphinimine] dichloride.

Another type of polymerisation catalyst suitable for use in the present invention are monocyclopentadienyl complexes comprising heteroallyl moieties such as zirconium (cyclopentadienyl) tris (diethylcarbamates) as described in U.S. Pat. No. 5,527,752 and WO 99/61486.

Particularly preferred metallocene complexes for use in the preparation of the supported catalysts of the present invention may be represented by the general formula:

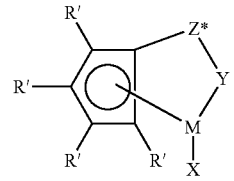

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*{=}CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\Theta^4$-1,3-pentadiene; s-trans-$\eta^4$-1,4-ditolyl-1,3-butadiene; s-trans-$\eta^4$-1,4-bis(trimethylsilyl)-1,3-butadiene: s-cis-$\eta^4$-3-methyl-1,3-pentadiene; s-cis-$\eta^4$-1,4-dibenzyl-1,3-butadiene: s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R)— or —P(R)— wherein R is $C_{1-10}$ hydrocarbyl.

Most preferred complexes are amidosilane- or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl) dimethyl silanetitanium-$\eta^4$-1,3-pentadiene.

The loading (transition metal) in the supported catalysts of the present invention is typically in the range 0.1 μmol/g to 1 mmol/g.

The polymerization catalyst and activating supports may be combined in any suitable manner.

Preferably the activating support and the polymerization catalyst are combined in a suitable solvent.

The activated supported catalyst system may optionally be used in the presence of a scavenger material such as an organometallic compound.

Preferably the organometallic compound is an organoaluminum compound.

A most preferred organoaluminum compound is triisobutylaluminium.

According to another aspect of the present invention there is provided a catalyst system for the polymerisation of olefins comprising
(a) a transition metal compound, and
(b) an activated support as hereinbefore defined or prepared by the process defined above The preferred transition metal compound is a metallocene.

The supported catalyst systems of the present invention are most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene. 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system prepared as hereinbefore described.

The preferred α-olefins are 1-butene, 1-hexene, 4-methyl-1-pentene and 1-octene.

The most preferred α-olefin is 1-hexene.

Advantages

The activating supports of the present invention provide supported polymerization catalyst systems having excellent activities. In particular activities may be improved by increasing the content of the transition metal present in the supported polymerization catalyst.

The preparative route is also more economic than typical supported metallocene catalyst systems based on aluminoxanes or borates as activators.

The present invention will now be further illustrated with reference to the following examples:

EXAMPLES

Method for Elemental Analyses (a) Fluoride

The fluoride content was determined by potentiometric analysis using a selective electrode. For this purpose the sample was prepared by Wurzschmitt combustion followed by acidic work-up. These methods are well known in the art.

The principle of combustion according Wurzschmitt lies in the quantitative conversion of fluorinated species into inorganic fluorides following a combustion reaction that takes place explosively in an airtight pure nickel bombs in which was introduce the sample, ethylene glycol, and sodium peroxide as an oxidant.

The combustion residues were taken up in deionized water. The excess of sodium peroxide was hydrolyzed. The hydrogen peroxide formed was decomposed by adding a cobalt salt and a gentle boil. Once the residual solution was brought to the required pH (~5 with $HNO_3$) and the quantity of fluoride ions in the solution was determined via selective electrode.

The assay was performed by external calibration (potential versus log of the concentration of fluoride). Standard solutions (prepared from NaF) and samples were measured under the same conditions.

The addition of a suitable buffer (cyclohexylenediaminetetraacetic acid) was used to adjust the pH to fix the ionic strength of the solution and break the complexed molecules thereby measuring the concentration of fluoride ions.

From the potentials measured in the samples, the concentrations of fluoride ions were then calculated using the parameters of the calibration curve previously established.

(b) Aluminium, Phosphorous

Aluminium and phosphorous content was determined by X-ray Fluorescnece Spectroscopy. For this purpose the sample was calcined in a Pt—Au crucible in the presence of lithium tetraborate. At a temperature of between 1000 and 1100° C., the catalyst was dissolved in the molten borate. The resulting homogeneous glass is shaped into discs which were examined in a X-ray fluorescence spectrometer The instrument calibration was performed with tetra-borate glasses containing salts of elements to be determined in known amounts.

(c) Boron

Boron content was determined by ICP-OES (Induction Coupled Plasma-Optical Emission Spetrometry). For this purpose the sample was treated in a sealed bomb under microwave irradiation with aqua regia (mixture of concentrated hydrochloride and nitric acids in a 3:1 ratio by volume). The resulting product was filtered and the boron content of the filtrate was analyzed in the ICP spectrometer.

Example 1

Preparation of Activated Supports

Thermal Treatment of Support

Silica (Sylopol 332 from Grace Davison) was subjected to the following heating procedure under nitrogen flow in 5 g batches:
from 30° C. to 100° C. in one hour
from 100° C. to 130° C. in 30 minutes
from 130° C. to 450° C. in one hour
maintained at 450° C. for four hours
The resulting silica has a surface silanol concentration of 1.3 mmol/g Support S1

To a suspension of 5.7 g of the above calcined silica in 40 mL of dry acetonitrile was added 2,4,6-trimethylpyridine (1.07 g, 8.9 mmol, 1.2 eq. per silanol) by dropwise addition and the suspension was stirred for 10 minutes at room temperature. After this period of stirring phosphorous oxychloride (1.36 g, 8.9 mmol, 1.2 eq. per silanol) was added slowly by dropwise addition and the suspension was stirred at room temperature for a further 2 hours at room temperature. The solvent was removed by decantation and the silica washed with reagent grade acetonitrile (2×30 mL), distilled water (2×30 mL) and methanol (2×30 mL). The resulting modified silica was then heated (40° C.) under vacuum for 1 hour and subsequently dried by use of an argon fluid bed (30° C. to 130° C. in 1 hour and retained at 130° C. for 3 hours).

To 1.9 g of the modified dried silica was added 30 mL of dry heptane. To this suspension was slowly added triethylaluminium (3.58 mL, 2.07 M in heptane. 7.41 mmol) by dropwise addition and the suspension was stirred for 1 hour at room temperature. The solvent was removed by decantation and the silica was washed with dry heptane (3×20 mL) and subsequently dried under vacuum.

The silica was then subjected to a the following thermal treatment steps a)-c):
a) Heated argon fluid bed:
from 30° C. to 130° C. in one hour
maintained at 130° C. for one hour
from 130° C. to 450° C. in one hour
maintained at 450° C. for four hours
b) Heated oxygen fluid bed (combustion step):
from 30° C. to 130° C. in one hour
maintained at 130° C. for one hour
from 130° C. to 450° C. in one hour
maintained at 450° C. for four hours
c) Heated argon fluid bed with 20 wt % $(NH_4)_2SiF_6$ (fluorination step):
from 30° C. to 450° C. in two hours
maintained at 450° C. for two hours The resulting activating support has the following characteristics:
Elemental analysis: Al, 3.06%; P, 0.21%; F, 13.44%.

Support S2

A second support was prepared using the same sequence of treatments described for support S1, except the phosphorus-modified silica was heated (40° C.) under vacuum for 1 hour, then dried by use of an argon fluid bed (30° C. to 130° C. in 1 hour and retained at 130° C. for 3 hours) and subsequently heated under vacuum (30° C. to 130° C. in 1 hour and retained at 130° C. for 3 hours).

Elemental analysis: Al, 3.17%; P, 0.29%: F, 7.91%.

Support S3:

To a suspension of 4.3 g of calcined silica in 40 mL of dry acetonitrile was added 2,4,6-trimethylpyridine (679 mg, 5.6 mmol. 1.0 eq. per silanol) by dropwise addition and the suspension was stirred for 10 minutes at room temperature. After this period of stirring phosphorous oxychloride (859 mg, 5.6 mmol. 1.0 eq. per silanol) was added slowly by dropwise addition and the suspension was stirred for a further 2 hours at room temperature. The solvent was removed by decantation and the silica washed with reagent grade acetonitrile (2×30 mL), distilled water (2×30 mL) and methanol (2×30 in L). The resulting modified silica was then dried under vacuum for 1 hour and subsequently dried by use of an argon fluid bed (30° C. to 130° C. in 1 hour and retained at 130° C. for 3 hours) and then heated under vacuum (30° C. to 130° C. in 1 hour and retained at 130° C. for 3 hours).

To 1.2 g of dried silica was added 30 mL of dry heptane. To this suspension was slowly added triethylborane (4.68 mL, 1.0 M in hexanes, 4.68 mmol) by dropwise addition and the suspension was stirred for 1 hour at room temperature. The solvent was removed by decantation and the silica was washed with dry heptane (3×20 mL) and subsequently dried under vacuum. The silica was then subjected to the same thermal treatment steps a)-c) described for support S1.

Elemental analysis: B, 0.25%; P, 0.64%; F, 4.5%.

Support S4:

To a suspension of 5.0 g of non calcined silica (Sylopol 332 from Grace Davison) in 40 mL of methanol was added phosphoric acid (749 mg, 6.5 mmol). The suspension was stirred for 1 hour at room temperature and the solvent removed in vacuo. The resulting silica was then calcined under nitrogen using the following heating procedure:

from 30° C. to 100° C. in one hour
from 100° C. to 130° C. in 30 minutes
from 130° C. to 450° C. in one hour
maintained at 450° C. for four hours The resultant calcined silica was suspended in 40 mL of dry heptane and triethylaluminium ((6.28 mL, 2.07 M in heptane, 13.0 mmol) was added slowly and the suspension was stirred for 1 hour at room temperature. The solvent was removed by decantation and the silica was washed with dry heptane (3×20 mL) and subsequently dried under vacuum. The silica was then subjected to the same thermal treatment steps a)-c) described for support S1 except 10 wt % $(NH_4)_2SiF_6$ are used.

Elemental analysis: Al, 176%: P, 0.64% F, 5.55%.

Elemental Analyses Summary

| Support | F content (wt %) | Al content (wt %) | B content (wt %) | P content (wt %) |
|---|---|---|---|---|
| S1 | 13.44 | 3.06 | | 0.21 |
| S2 | 7.91 | 3.17 | | 0.29 |
| S3 | 4.5 | | 0.25 | 0.22 |
| S4 | 5.55 | 3.76 | | 0.64 |

Example 2

Polymerization Reactions

To approximately 300 mL of a 1 mM solution of triisobutylaluminium in heptane were added 25 mg activating support. To this mixture was then added a toluene solution of ethylene(bis(1-indenyl) zirconium dichloride in order to obtain a final catalyst concentration of 2 µM and then finally 2 mL of 1-hexene. The reaction mixture was transferred to a reactor, which had been cleaned with triethyl aluminium solution, using a cannula. The reaction mixture was put under an atmosphere of ethylene under continuous stirring and allowed to heat to 80° C. Once the reactor had reached 80° C. the pressure of ethylene was maintained at 3 bars for 1 hour. At the end of the polymerization procedure the polymer was collected by filtration, washed with methanol and dried under vacuum.

Table 1 shows summary of polymerization results obtained using supports made using the activating supports S1-S4.

TABLE 1

| Run | Support | Activity (g/g of support · h) | Activity (kg/mol Zr · h) |
|---|---|---|---|
| 1 | S1 | 227 | 9724 |
| 2 | S2 | 593 | 20077 |
| 3 | S3 | 41 | 1662 |
| 4 | S4 | 216 | 8308 |

Table 2 shows the effect of increasing the Zr content (contacted with supports S1 and S2). Runs were also performed using comparative support (CS1) prepared according to Example 2 in the aforementioned WO 2007/014889 by functionalizing the support with an alkylating agent (triethylaluminium) followed by heating under an inert gas then under oxygen and finally treatment with a fluorinating agent (10 wt % $SiF_6(NH_4)_2$).

TABLE 2

| Run | Support | catalyst/support (wt %) | activity (g/g support · h) | activity (kg/mol Zr · h) |
|---|---|---|---|---|
| 5 | S1 | 0.75 | 227 | 9724 |
| 6 | S1 | 1.57 | 430 | 8425 |
| 7 | S1 | 3.83 | 595 | 4760 |
| 8 | S2 | 0.91 | 593 | 20077 |
| 9 | S2 | 2.01 | 836 | 12742 |
| 10 | S2 | 3.83 | 927 | 7413 |
| 11 | CS1 | 0.81 | 305 | 9738 |
| 12 | CS1 | 1.64 | 318 | 4781 |
| 13 | CS1 | 3.56 | 340 | 2319 |

FIG. 1 represents a plot of activity against catalyst loading. The FIGURE clearly shows that with the activating supports of the present invention the activity increases more rapidly than with the supports of the prior art.

Example 3

Polymerization reaction

To 25 mg of activating support was added a mixture of $C_5Me_4SiMe_2N^tBu)Ti(\eta^4$-1,3-pentadiene (444 µL, 1.8 mM in heptane. 0.8 µmol) and triisobutylaluminium (92 µL, 0.87 M in heptane, 80 µmol). To the mixture was added 300-400 mL of heptane and finally 2 mL of 1-hexene. The reaction mixture was transferred to a reactor, which had been cleaned with triethyl aluminium solution, using a cannula. The reaction mixture was put under an atmosphere of ethylene under continuous stirring and allowed to heat to 80° C. Once the reactor had reached 80° C. the pressure of ethylene was maintained at 4 bars for 1 hour. At the end of the polymerization procedure the polymer was collected by filtration, washed with methanol and dried under vacuum.

Table 3 shows summary of polymerization results obtained using supports made using the activating supports S2, S3 and CS1.

TABLE 3

| Run | Support | Activity (g/g of support · h) | Activity (kg/mol Ti · h) |
|---|---|---|---|
| 14 | S2 | 500 | 15613 |
| 15 | S3 | 11 | 343 |
| 16 | CS1 | 410 | 12800 |

Example 4

Polymerization Reaction

To approximately 300 mL of a 1 mM solution of triethylaluminium in heptane were added 50 mg of activating support. To this mixture was then added 2,3-bis(2,6-dimethylphenylimino)butane nickel dichloride in toluene in order to obtain a final catalyst concentration of 2 µM. The reaction mixture was transferred to a reactor, which had been cleaned with triethylaluminium solution, using a cannula. The reaction mixture was put under an atmosphere of ethylene under continuous stirring at 25° C. The temperature was maintained at 25° C. and the pressure of ethylene was kept at 3 bars for 1 hour. At the end of the polymerization procedure the polymer was collected by filtration, washed with methanol and dried under vacuum Table 4 shows summary of polymerization results obtained using supports made using the activating supports S2 and CS1.

TABLE 4

| Run | Support | Activity (g/g of support · h) | Activity (kg/mol · Ni · h) |
|---|---|---|---|
| 17 | S2 | 25 | 799 |
| 18 | CS1 | 14 | 459 |

The invention claimed is:
1. An activating support prepared by the steps of
 (a) providing a porous mineral oxide support material,
 (b) treating the support with a phosphorus-containing compound,
 (c) treating the support from step (b) with an organometallic compound,
 (d) heating the functionalized support from step (c) under an inert gas and then under an atmosphere comprising oxygen,
 (e) fluorinating the support with a fluorinating agent, and
 (f) recovering an activating support.
2. An activating support according to claim 1 wherein the phosphorus-containing compound is a phosphorus acid and derivatives, a fluorinated phosphoric acid, or a metaphosphate.
3. An activating support according to claim 1 wherein the phosphorus-containing compound is phosphorous oxychloride [POCl$_3$] or phosphoric acid.
4. An activating support according to claim 1 wherein the organometallic compound is an alkylated derivative of a Group 1, 2 or 13 metal.
5. An activating support according to claim 1 wherein the organometallic compound is an alkylated derivative of aluminium or boron.
6. An activating support according to claim 1 wherein the organometallic compound is an organoaluminium compound.
7. An activating support according to claim 6 wherein the organoaluminium compound is triethylaluminium.
8. An activating support according to claim 1 wherein the porous mineral oxide support material is silica.
9. An activating support according to claim 1 wherein the functionalized support from step (b) is heated under an inert gas at a temperature in the range 100-600° C.
10. An activating support according to claim 1 wherein the functionalized support from step (b) is heated under an atmosphere comprising oxygen at a temperature in the range 100-600° C.
11. An activating support according claim 1 wherein the fluorinating agent is ammonium hexafluorosilicate.
12. An activating support comprising a porous mineral oxide support material, phosphorus, fluorine and a Group 1, 2 or 13 metal, said activating support prepared by a method comprising contacting the porous mineral oxide support material with a phosphorus-containing compound, an organometallic compound of a metal of Groups 1, 2 or 13 and a fluorinating agent.
13. An activating support comprising a porous mineral oxide support material, phosphorus and fluorine wherein said activating support is prepared by contact of said porous mineral oxide support material with a phosphorus-containing compound prior to contact with a fluorinating agent.
14. An activating support comprising a porous mineral oxide support material, phosphorus, fluorine and an organometallic compound having a Group 1, 2 or 13 Group metal.
15. An activating support according to claim 12 wherein the porous oxide support material is silica.
16. An activating support according to claim 12 wherein the organometallic Group 1, 2 or 13 metal is aluminium or boron.
17. A supported catalyst system for the polymerisation of olefins comprising
 (a) a transition metal compound, and
 (b) an activated support according to claim 1.
18. A supported catalyst system according to claim 17 wherein the transition metal compound is a metallocene.
19. A supported catalyst system according to claim 18 wherein the metallocene has the general formula:

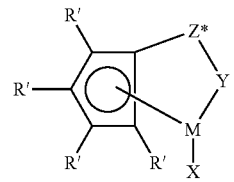

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms $\pi$-complex with M;
Y is —O—, —S—, —NR*—, —PR*—,
M is titanium or zirconium in the +2 formal oxidation state;
Z* is SiR*$_2$, CR*$_2$, SiR*$_2$SiR*$_2$, CR*$_2$CR*$_2$, CR*=CR*, CR*$_2$SiR*$_2$, or GeR*$_2$,
wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.
20. A catalyst system according to claim 19 wherein M is titanium.
21. A process for the polymerisation of ethylene or the copolymerisation of ethylene and α-olefins having from 3 to 10 carbon atoms, said process performed under polymerisation conditions in the presence of a supported catalyst system according to claim 17.
22. A process according to claim 21 performed in the slurry or gas phase.
23. A process according to claim 21 wherein the α-olefin is 1-hexene.

24. An activating support according to claim 9 wherein the functionalized support from step (b) is heated under an inert gas at a temperature in the range 150-450° C.

25. An activating support according to claim 10 wherein the functionalized support from step (b) is heated under an atmosphere comprising oxygen at a temperature in the range 150-450° C.

* * * * *